United States Patent [19]

Bollmann et al.

[11] 4,363,062

[45] Dec. 7, 1982

[54] INDUCTIVE VOLTAGE TRANSFORMER AND CIRCUIT THEREFOR

[75] Inventors: Klaus Bollmann; Hans-Joachim Freygang; Jürgen Moeller; Manfred Weniger, all of Berlin, Fed. Rep. of Germany

[73] Assignee: Siemens Aktiengesellschaft, Munich, Fed. Rep. of Germany

[21] Appl. No.: 268,162

[22] Filed: May 29, 1981

[30] Foreign Application Priority Data

May 30, 1980 [DE] Fed. Rep. of Germany ....... 3021002

[51] Int. Cl.³ .............................................. H02H 7/04
[52] U.S. Cl. ....................................... 361/35; 361/156
[58] Field of Search ................. 361/4, 6, 35, 112, 113, 361/156, 159; 323/239

[56] References Cited

U.S. PATENT DOCUMENTS

| 2,610,231 | 9/1952 | Wettstein | 361/4 |
| 2,789,253 | 4/1957 | Vang | 361/4 |
| 4,016,485 | 4/1977 | Samorodov et al. | 361/113 X |
| 4,307,428 | 12/1981 | Yanabu et al. | 361/4 |

OTHER PUBLICATIONS

"The Cause and Control of Some Types of Switching Surges"-Schroeder Transactions AIEE, pp. 696-700, 11/1943.

Primary Examiner—Harry E. Moose, Jr.
Attorney, Agent, or Firm—Kenyon & Kenyon

[57] ABSTRACT

Disclosed are an inductive voltage transformer having a primary winding connected to a network line and a protective circuit therefor. In order to prevent a large thermal and mechanical stress in such a transformer, the protective circuit comprises a control unit which controls a switching device for connecting a circuit arrangement to a secondary winding of the voltage transformer. The circuit arrangement includes a current generating circuit with a charging capacitor. The protective circuit operates to generate a current causing a counter excitation in the transformer to that caused when the capacitance of the network line is discharged via the primary winding of the transformer. The voltage transformer and the protective circuit are suited particularly for connection to network lines having a large internal capacitance.

16 Claims, 4 Drawing Figures

INDUCTIVE VOLTAGE TRANSFORMER AND CIRCUIT THEREFOR

BACKGROUND OF THE INVENTION

The present invention relates generally to an inductive voltage transformer in which the primary winding is coupled to a network line whose voltage is to be supervised (monitored, regulated, measured, etc.), and to a protective circuit therefor.

DE-AS No. 10 77 319 discloses an inductive voltage transformer having a primary winding which is connected directly to a network line carrying the voltage to be supervised. The transformer is connected in series with a resistor and at least one secondary of the transformer winding is provided with or connected to a load.

OBJECTS OF THE INVENTION

It is an object of the present invention to eliminate or substantially reduce mechanical and thermal stresses and overloads to which an inductive voltage transformer connected directly to a network line, particularly a line having a large internal capacitance, may otherwise be subjected.

It is another object of the present invention to eliminate or substantially reduce mechanical and thermal stresses and overloads which may otherwise occur in an inductive voltage transformer connected directly to a network line in switching states of the network line.

SUMMARY OF THE INVENTION

The invention is premised on the recognition by the applicant's that discharge of the capacitance of a network line occurs through the primary winding of an inductive voltage transformer connected thereto. Since the charge on an unloaded network line having a relatively large internal capacitance can be great, in some cases the discharge through the transformer primary winding can lead to destruction of the transformer. More particularly, a network line having a high internal capacitance connected between bus bars through respective supervisory (monitoring, regulating, measuring, etc.) stations which include an inductive voltage transformer, charges to the peak value of the voltage on the line when the line is disconnected. Since the capacitance current of the unloaded line is shifted 90° relative to the voltage, and the arc of a breaker associated with the monitoring station is extinguished at the zero crossing of the current, the network line assumes the peak value of the voltage. The network line retains the peak voltage until the inductance of the inductive voltage transformer primary winding connected thereto has gone into saturation (assuming that the inductive voltage transformer secondary winding is not loaded with a low resistance). When the inductance of the inductive voltage transformer primary winding goes into saturation, it provides a low impedance to the network line and a large current flows through the primary winding of the transformer limited only by the winding resistance and stray inductances. The large current flowing through the primary winding can cause a thermal stress and a mechanical stress large enough to destroy the inductive voltage transformer.

According to the invention, the inductive voltage transformer is protected by preventing appreciable saturation of the primary winding. This is accomplished in accordance with the invention by generating a counter-excitation at the secondary winding of the inductive voltage transformer which is controlled from the primary winding. Further in accordance with the invention, means for generating the counter-excitation are coupled to a secondary winding of the inductive voltage transformer.

In accordance with one aspect of the invention, the means for generating the counter-excitation selectively generates in the inductive transformer primary a current flow which oppose a large current flow in the transformer primary winding.

Further in accordance with the invention, the means for selectively generating comprises current generating means coupled to a transformer secondary winding and switching means coupled to the transformer primary winding for selectively activating the current generating means or for connecting the current generating means to the transformer secondary winding.

In one embodiment of the invention, the current generating means comprises a charging circuit including a charging capacitor coupled to a secondary winding of the transformer through the switching means. In response to a large current flow in the primary which can result when the capacitance of the network line is discharged through the primary winding, the switching means switches the charging circuit into connection with the secondary winding through a low impedance path. When so connected to the secondary winding, the charging circuit generates a current which flows through the secondary winding and causes a corresponding excitation in the primary which is counter to the excitation resulting in the primary from discharge of the capacitance of the network line.

More particularly, the invention provides apparatus including control means connected for example to a resistor which is connected in series with the primary winding, and switching means controlled by the control means. The switching means upon being activated by the control means provides a current path from current generating means through a secondary winding of the transformer such that an excitation is developed in the transformer which corresponds to and is counter to the excitation caused by discharge of the network line. Consequently, saturation of the inductance of the primary winding does not occur in the inductive voltage tranformer and therefore thermal and mechanical overload of the transformer is prevented, even in switching states of the network line.

According to the invention, switching means can be configured on the secondary side in various ways. Advantageously, in accordance with one embodiment of the invention, the switching means is connected to that secondary winding to which the usual load is connected. This has the advantage that the voltage transformer need not be provided with an additional secondary winding solely for generating the counter-excitation However, particular loads have to be selected in view of the switching means and current generating means.

In another embodiment of the invention, the switching means can be connected to an additional secondary winding. This has the advantage that the load connected to the normally provided secondary winding can be provided in the usual manner, taking all pertinent requirements into consideration.

According to the invention, the switching means can take different forms. Preferably, the switching means is controlled electronically. Advantageously, the switching means can include a controlled rectifier, for example, a thyristor.

According to one aspect of the invention, switching means are provided which control the direction of the counter-excitation so that the direction can be selected depending on the discharge conditions of the capacitance of the network line. In a disclosed embodiment, such switching means comprise two sets of controlled rectifiers each set of which is connected to an output of the switching means. Counter-excitation current can flow from the current generating means through the secondary winding alternatingly in opposite directions via respective sets of rectifiers so that counter-excitations with different directions can be obtained.

The current generating means according to a disclosed embodiment comprises a charging capacitance and a charge source connected to the charging capacitance via a rectifier.

These and other objects, aspects, features and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE DRAWINGS AND THE PREFERRED EMBODIMENTS

Referring now more particularly to the drawings, the development of the invention will be described in connection with FIGS. 1 and 2 and two embodiments of the invention will be described in connection with FIGS. 3 and 4.

Figure 1:
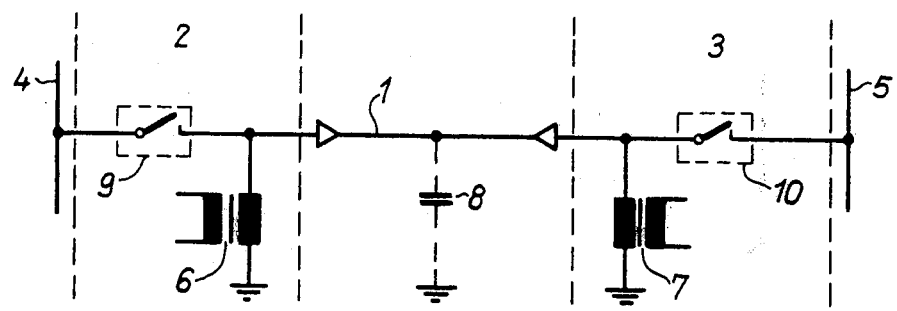
FIG. 1 is a circuit diagram showing voltage transformers connected without apparatus according to the invention in respective supervisory stations to a network line having a large internal capacitance.
Figure 2:
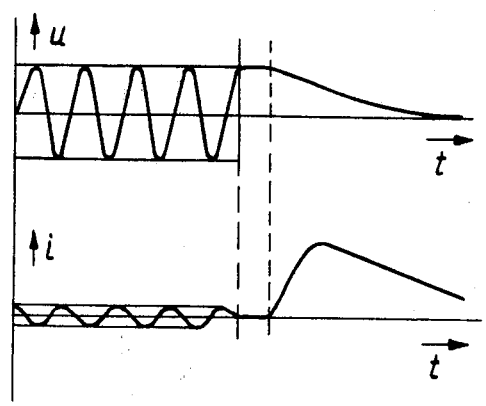
FIG. 2 is a waveform diagram of the voltage and current in the primary winding of the transformers in FIG. 1.

Referring first to FIGS. 1 and 2, a network line having a large internal capacitance, for example, a cable 1, is connected via two supervisory (monitoring, regulating, measuring, etc.) stations 2 and 3 to bus bars 4 and 5. Each supervisory station, 2 and 3, is equipped with a voltage transformer 6 and 7, respectively. The internal capacitance of cable 1, represented by capacitor 8, is charged to the peak value of the voltage if the cable 1 is disconnected. The reason for this is that, as shown in FIG. 2, the capacitance current i of the unloaded cable is shifted 90° relative to the voltage u upon disconnecting the network line which is indicated by the first dotted line relative to time in FIG. 2. Since the arc of the respective breaker 9 or 10, associated with a respective station is extinguished at the zero crossing of the current, the voltage on the network line assumes its peak value. The cable 1 retains this voltage until the main (primary) inductance of the associated inductive voltage transformer 6 or 7 has gone into saturation as indicated by the second dotted line relative to time in FIG. 2. (It is assumed that the inductive voltage transformer is not loaded on the secondary side with a low resistance.) If the main inductance of the inductive voltage transformer has gone into saturation, then it provides a low impedance to the cable and a large current (to the right of the second dotted line in the lower, current vs. time diagram of FIG. 2) then flows from the cable through the primary winding of the voltage transformer 6 or 7 limited only by the winding resistance and the stray inductances of the transformer. This large current can cause not only a thermal stress but also a mechanical stress which can become large enough to destroy the voltage transformer.

Figure 3:
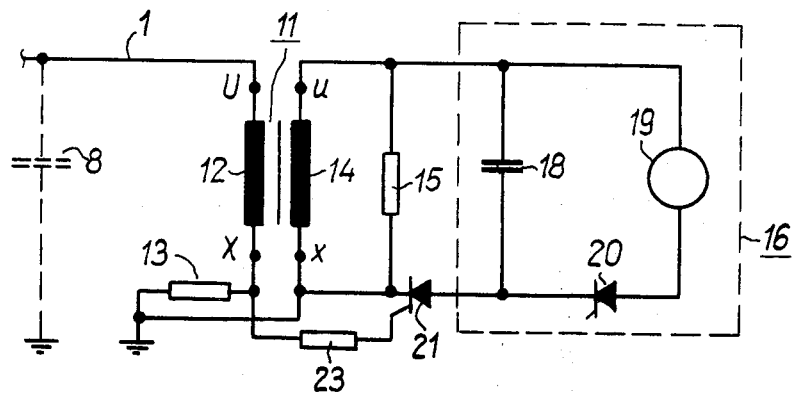
FIG. 3 is a circuit diagram showing a voltage transformer connected to a network line in accordance with the invention with apparatus according to one embodiment of the invention.
Figure 4:
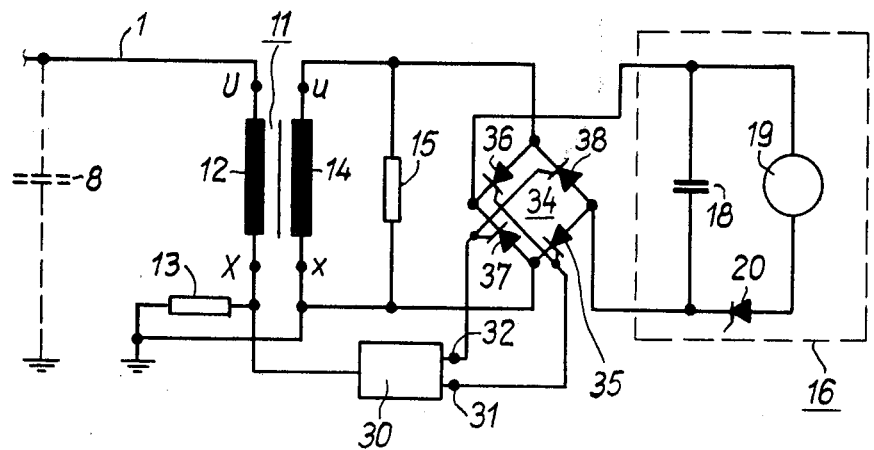
FIG. 4 is a circuit diagram showing a voltage transformer connected to a network line in accordance with the invention with apparatus according to another embodiment of the invention.

This is prevented in accordance with the invention in the two embodiments illustrated in FIGS. 3 and 4. The inductive voltage transformer 11 shown in FIG. 3 includes a primary winding 12 having winding ends designated in the usual manner with U, X. The winding end U is connected to the network line 1 which has an internal capacitance to ground represented in FIG. 3 by the capacitance 8. A resistor 13 is connected between one end of the winding end X of the primary winding 12 and ground to form together with the primary winding 12, a discharge circuit for the capacitance 8 of the network line 1 when it is unloaded.

The winding ends of a secondary winding 14 of the inductive voltage transformer 11 are similarly designated in the usual manner with u and x and a load 15 is connected to the secondary winding in the usual manner. In addition, a current generating circuit arrangement 16 is connected to the secondary winding 14. The circuit arrangement 16 includes a charging circuit which comprises a charging capacitor 18 and a charge source 19. The charge source 19 is connected to the capacitor 18 preferably via a controlled rectifier 20 (e.g. a zener diode) or optionally via a resistor (not shown). The circuit arrangement 16 is connected to the secondary winding 14 through a control circuit which includes a switching device connected between the secondary winding end x and the circuit arrangement 16 and a control input connected to the primary winding end x. As depicted in FIG. 3, the switching device can be a controlled rectifier 21 having is anode connected to the circuit arrangement 16, its cathode connected to the secondary winding end x, and its control input connected to the primary winding end x via a resistor 23.

The inductive voltage transformer 11 shown in FIG. 3 and connected as described above operates as follows.

Discharge of the capacitance 8 of the network line 1 via the primary winding 12 of the inductive voltage transformer 11 causes a voltage drop across resistor 13 which is connected in series with the primary winding. This voltage is coupled across the control input of controlled rectifier 21 and switches the controlled rectifier 21 into conduction. As a result, the circuit arrangement 16 with the charging capacitor 18 is connected to the secondary winding through the low impedance of the controlled rectifier and is presented with the low impedance of the secondary winding 14. The charging capacitor 18 then discharges through the low impedance secondary winding via the controlled rectifier 21. The discharge current flowing in the secondary winding generates an excitation of the inductive voltage transformer 11 in a direction which is opposed to the excitation caused by the discharge current of the capacitance 8 of the network line 1, so that saturation of the inductive voltage transformer 11 is prevented.

The large current shown in FIG. 2 after the circuit breakers are switched to disconnect the cable 1, as represented by the first dotted line, is prevented as is thermal and mechanical overload of the voltage transformer 11.

Referring to FIG. 4, a control unit 30 replaces resistor 23 of FIG. 3 and a bridge circuit 34 replaces the controlled rectifier 21 of FIG. 3. The control unit 30 has two outputs 31 and 32 which are connected to the bridge circuit 34. The circuit arrangement 16 of FIG. 4 includes a charging circuit comprising a charging capacitor 18 and a charge source 19, as in FIG. 3, and connected to the secondary winding 14 via the bridge circuit. The bridge circuit 34 of four controlled rectifiers 35, 36 and 37, 38 comprises the switching circuit rather than a controlled rectifier 21 in FIG. 3. The rectifiers 35 to 38 are arranged so that two opposite set of controlled rectifiers 35, 36 and 37, 38, respectively, are connected to an output 31 and 32, respectively, of the control unit 30.

The control unit 30 includes therein polority sensing means and provides control signals at outputs 31 and 32 which depend on the polarity of the current in the control unit. For example, the control unit can include a resistor 13 connected to the transformer primary winding end x, as in FIG. 3, and means to sense the voltage drop across resistor 13. Thus, depending on the polarity of the voltage drop across resistor 13, only the controlled rectifiers 35 and 36 or the controlled rectifiers 37 and 38 are switched into conduction. The discharge current from the charging capacitor 18 correspondingly flows through the secondary winding 14 either in the direction from the end u of the winding to the end x of the winding or in the opposite direction. Accordingly, depending on the polarity of the charge stored in the capacitance 8 of the network line 1, a discharge current can flow through the secondary winding 14 so that it causes a counter-excitation to the excitation caused by the discharge current of the capacitance 8 regardless of polarity. This prevents saturation of the inductive voltage transformer 11 from discharge processes of the capacitance of the network line regardless of polarity and prevents thermal and mechanical overload of the transformer by a large current flow which could otherwise destroy the transformer.

A particular advantage of the embodiment of FIG. 4 is the capability of storing charge that has leaked from the network line via the primary winding in the charging capacitor which can be utilized for the counter-excitation by switching the switching device in a reverse manner.

According to the invention, an inductive voltage transformer is connected and apparatus for connection to the transformer are provided which prevent overload or damage to the transformer from discharge processes on the network line to which the transformer primary winding is connected.

The advantages of the present invention, as well as certain changes and modifications of the disclosed embodiments thereof, will be readily apparent to those skilled in the art. It is the applicant's intention to cover by their claims all those changes and modifications which could be made to the embodiments of the invention herein chosen for the purposes of the disclosure without departing from the spirit and scope of the invention.

What is claimed is:

1. Apparatus for connection to an inductive voltage transformer having a primary winding connected directly to a network line and at least one secondary winding connected a load, the apparatus comprising control means connected to the transformer primary, switching means connected to the control means, and means for generating current, the control means controlling switching of the switching means, the switching means coupling the current generating means to a secondary winding of the voltage transformer, the switching means providing a low impedance between the transformer secondary and the current generating means responsive to the control means, whereby current fed to the transformer secondary from the current generating means causes an excitation opposed to the excitation caused by the discharge of a capacitance associated with the network line through the transformer primary winding.

2. The apparatus according to claim 1 and including a resistor connected between the transformer primary and ground to which the control means is connected.

3. The apparatus according to claim 2, wherein the current generating means is coupled to the secondary winding to which a usual load of the transformer is connected.

4. The apparatus according to claim 2, wherein the current generating means is coupled to an additional secondary winding of the transformer.

5. The apparatus according to claim 1 or 2, wherein the switching means comprises a controlled rectifier having its control input connected to the control means and its anode and cathode connected between the transformer secondary and the current generating means.

6. The apparatus according to claim 1 or 2, wherein the switching means comprises a bridge circuit of four controlled rectifiers in which sets of two rectifiers are connected opposite to each other, the control means including two outputs one of which is connected to one set of controlled rectifiers and the other of which is connected to the other set of rectifiers, the control means being operative to activate one of the outputs at a time in dependance on a polarity sensed by the control means.

7. The apparatus according to claim 1 or 2, wherein the current generating means comprises a current source and a capacitor, the current source being connected to the capacitor and the capacitor being coupled to the secondary winding through the switching means.

8. The apparatus according to claim 7 and comprising a controlled rectifier coupling the current source and the capacitor.

9. In a voltage transformer having a primary winding connected to a network line, the improvement comprising apparatus connected to the transformer for causing an excitation in the transformer opposed to the excitation caused by a discharge of the capacitance of the line through the primary winding of the transformer, the apparatus comprising control means connected to the transformer primary, switching means connected to the control means, and means for generating current, the control means controlling switching of the switching means, the switching means coupling current generating means to a secondary winding of the voltage transformer, the switching means providing a low impedance between the transformer secondary and the current generating means responsive to the control means whereby current fed to the transformer secondary from the current generating means causes an excitation opposed to the excitation caused by the discharge of a capacitance associated with the network line through the transformer primary winding.

10. The improvement according to claim 9 and including a resistor connected between the transformer primary and ground to which the control means is connected.

11. The improvement according to claim 10, wherein the current generating means is coupled to the secondary winding to which a usual load of the transformer is connected.

12. The improvement according to claim 10, wherein the current generating means is coupled to an additional secondary winding of the transformer.

13. The improvement according to claim 9 or 10, wherein the switching means comprises a controlled rectifier having its control input connected to the control means and its anode and cathode connected between the transformer secondary and the current generating means.

14. The improvement according to claim 9 or 10, wherein the switching means comprises a bridge circuit of four controlled rectifiers in which sets of two rectifiers are connected opposite to each other, the control means including two outputs one of which is connected to one set of controlled rectifiers and the other of which is connected to the other set of rectifiers, the control means being operative to activate one of the outputs at a time in dependance on a polarity sensed by the control means.

15. The improvement according to claim 9 or 10, wherein the current generating means comprises a current source and a capacitor, the current source being connected to the capacitor and the capacitor being coupled to the secondary winding through the switching means.

16. The improvement according to claim 15 and comprising a controlled rectifier coupling the current source and the capacitor.

* * * * *